H. McDONALD.
Puddling-Furnaces
No. 5,500. Reissued July 22, 1873.
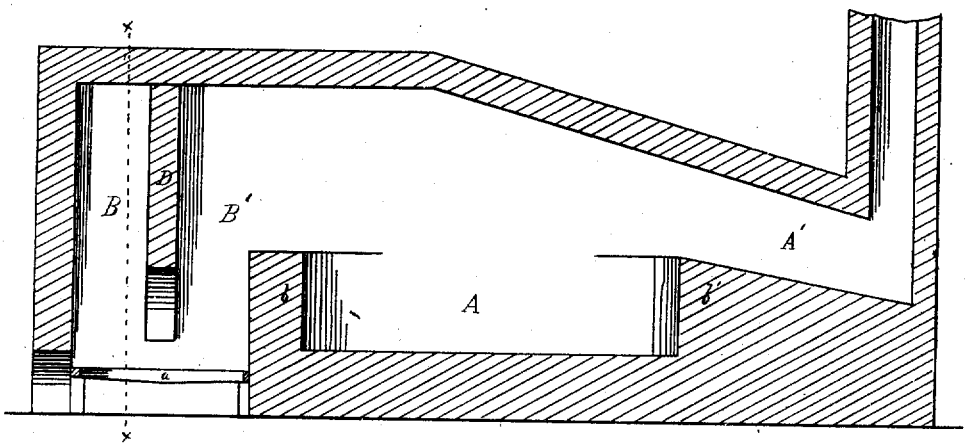
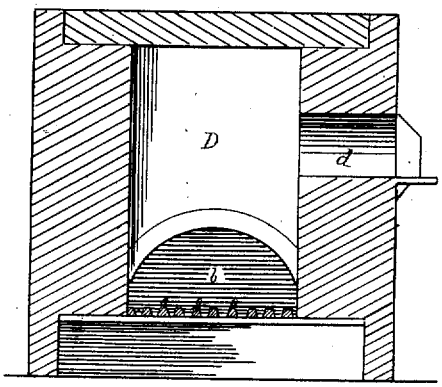
WITNESSES
James L. Kay
R. E. Henderson
INVENTOR
Hugh McDonald,
by Bakewell, Christy & Kerr,
his attys.
THE NORRIS PETERS CO., PHOTO-LITHO., WASHINGTON, D. C.

UNITED STATES PATENT OFFICE.

HUGH McDONALD, OF PITTSBURG, PENNSYLVANIA.

IMPROVEMENT IN PUDDLING-FURNACES.

Specification forming part of Letters Patent No. 129,153, dated July 16, 1872; reissue No. 5,500, dated July 22, 1873; application filed February 24, 1873.

*To all whom it may concern:*

Be it known that I, HUGH McDONALD, of Pittsburg, in the county of Allegheny and State of Pennsylvania, have invented a new and useful Improvement in Puddling-Furnace; and I do hereby declare the following to be a full, clear, and exact description thereof, reference being had to the accompanying drawing making a part of this specification, in which—

Figure 1 is a longitudinal vertical section of an ordinary puddling or boiling furnace fitted with my improvement; and Fig. 2 is a transverse vertical section through *x x*, Fig. 1.

Like letters of reference indicate like parts in each.

One of the considerable items of expense incurred in the manufacture of iron by the process of boiling or puddling is that of fuel, since a large percentage of its heat-producing properties escapes as smoke, unconsumed gases, &c. To remedy this smoke-consuming furnaces have been devised, most of which are objectionable on account of cost, complication, or for other reasons.

By my improvement I adapt the ordinary fire-chamber of a puddling, boiling, heating, or smelting furnace for use as a smoke-burner, without materially lessening its capacity as a chamber for the combustion of fuel, whereby, at small cost, each such furnace may be converted to a smoke-burner, with the desired result in saving of fuel and increase of effective heat.

To enable others skilled in the art to make and use my improvement, I will proceed to describe its construction and mode of operation.

In the drawing, B and B′ represent the fire-chamber of an ordinary puddling or boiling furnace; *a*, the grate-bars; *b*, the fire-bridge; A, the working-chamber; *b′*, the flue-bridge; and A′, the neck. Transversely across the fire-chamber B B′, from one side wall to the other, I build a partition-wall, D, which extends down from the top or cover till its lower edge is about even with or a little below the upper edge or surface of the fire-bridge *b*, and still far enough above the grate-bars *a* to leave room for working forward the fuel from the chamber B to the chamber B′. Preferably its lower edge is of arch form, as shown, though it may be straight. This partition-wall is at or not far from a point equidistant between the end wall and the fire-bridge *b*; though in this respect I do not limit myself, provided only it be so arranged as to leave a chamber, B, into which the raw fuel is fed through a stop-hole, *d*, or other suitable opening, and also a combustion-chamber, B′, of suitable capacity, for the more perfect combustion therein of smoke or incandescent fuel, or both. The chamber B′ is provided with a stop-hole similar to that shown at *d*. In the construction of new furnaces, the space for the chambers B B′ may be lengthened somewhat—say, a few inches, more or less—beyond the dimensions ordinarily adopted; but this is not essential.

The action of the heat on the metal in the chamber A, whether it be directly exposed to the heat, or inclosed in pots or crucibles, or covered by any materials with which it is to be treated, is well known; and the advantages of coking certain kinds of fuel in one chamber and feeding it along into another, where it or the smoke and gases evolved from it are to be burned, need not here be set forth.

Thus, by the simple interposition of the wall D, I secure for the ordinary puddling, boiling, heating, or smelting furnace all the material advantages which are sought to be accomplished by the construction of elaborate and costly smoke-burning contrivances.

Two or more walls, D, may be introduced, if so desired; but one I consider sufficient, in most cases, to secure a useful result.

In order that the chamber B′ may more perfectly perform its office, I extend the grating *a* back under it, or arrange a separate grating thereunder, so that air may be admitted freely therein.

It will be observed that the partition-wall D is of such form (having sides vertical, or nearly so) and such thickness relatively to the length of the fuel space or magazine that, while increasing the efficiency, it does not materially lessen the magazine capacity of the chambers B B′ for the reception and combustion of fuel, which feature is an important one, particularly in connection with the use of soft or bituminous coal as fuel.

What I claim as my invention, and desire to secure by Letters Patent, is—

In combination with the working-chamber of a puddling, boiling, heating, or smelting furnace, a partition-wall, D, extending transversely across the fire chamber or magazine, so as to divide the same into coking and combustion chambers B B′, and at the same time retain, substantially, its magazine capacity for the reception and combustion of fuel, as set forth.

In witness whereof I, the said HUGH McDONALD, have hereunto set my hand.

HUGH McDONALD.

Witnesses:
A. S. NICHOLSON,
G. H. CHRISTY.